(12) United States Patent
Tsunashima

(10) Patent No.: US 10,607,088 B2
(45) Date of Patent: Mar. 31, 2020

(54) IMAGE PROCESSING DEVICE, IMAGE PROCESSING METHOD, AND IMAGE PROCESSING SYSTEM

(71) Applicant: SONY CORPORATION, Tokyo (JP)

(72) Inventor: Nobuhiro Tsunashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/559,506

(22) PCT Filed: Feb. 17, 2016

(86) PCT No.: PCT/JP2016/054525
§ 371 (c)(1),
(2) Date: Sep. 19, 2017

(87) PCT Pub. No.: WO2016/167016
PCT Pub. Date: Oct. 20, 2016

(65) Prior Publication Data
US 2018/0121736 A1    May 3, 2018

(30) Foreign Application Priority Data

Apr. 14, 2015    (JP) ................................ 2015-082274

(51) Int. Cl.
*G06K 9/00*    (2006.01)
*H04N 7/18*    (2006.01)
(Continued)

(52) U.S. Cl.
CPC ..... *G06K 9/00765* (2013.01); *G06K 9/00771* (2013.01); *G06K 9/2054* (2013.01);
(Continued)

(58) Field of Classification Search
CPC .... G06K 9/00765; G06K 9/78; G06K 9/2054; G06K 9/00771; G06K 2209/21; H04N 5/225; H04N 7/18; H04N 5/232
See application file for complete search history.

(56) References Cited

U.S. PATENT DOCUMENTS

| 2007/0222858 A1* | 9/2007 | Sugimoto | .......... G06K 9/00362 348/143 |
| 2010/0119177 A1* | 5/2010 | Suzuki | ............... G06K 9/00771 382/307 |

(Continued)

FOREIGN PATENT DOCUMENTS

| CN | 101897174 A | 11/2010 |
| JP | 2001-333422 A | 11/2001 |

(Continued)

OTHER PUBLICATIONS

International Search Report dated May 10, 2016 in PCT/JP2016/054525 filed Feb. 17, 2016.
(Continued)

*Primary Examiner* — John W Lee
(74) *Attorney, Agent, or Firm* — Oblon, McClelland, Maier & Neustadt, L.L.P.

(57) ABSTRACT

The present disclosure provides an image processing device, image processing method, and image processing system that are capable of deciding a cutout region in accordance with change in the detection position of the same object between frame images captured at different times. The image processing device includes: a first region setting unit configured to set a first region including a detection position of an object in a cutout region in a first frame image; and a cutout region deciding unit configured to decide a cutout region in a second frame image subsequent to the first frame image, on the basis of a positional relation between the first region and a detection position of the object in the second frame image.

18 Claims, 13 Drawing Sheets

(51) Int. Cl.
*H04N 5/225* (2006.01)
*H04N 5/232* (2006.01)
*G06K 9/20* (2006.01)
*G06K 9/78* (2006.01)

(52) U.S. Cl.
CPC ............... *G06K 9/78* (2013.01); *H04N 5/225* (2013.01); *H04N 5/232* (2013.01); *H04N 7/18* (2013.01); *G06K 2209/21* (2013.01)

(56) References Cited

U.S. PATENT DOCUMENTS

| | | | | |
|---|---|---|---|---|
| 2011/0007175 A1* | 1/2011 | Fujita | ..................... | G03B 5/00 |
| | | | | 348/222.1 |
| 2013/0176460 A1* | 7/2013 | Nakashima | ............ | H04N 5/225 |
| | | | | 348/231.99 |
| 2018/0108144 A1* | 4/2018 | Tsunashima | ........... | H04N 5/225 |

FOREIGN PATENT DOCUMENTS

| | | |
|---|---|---|
| JP | 2007-6111 A | 1/2007 |
| JP | 2009/147727 A | 7/2009 |
| JP | 2012-253723 A | 12/2012 |
| JP | 2015-23294 A | 2/2015 |

OTHER PUBLICATIONS

Combined Chinese Office Action and Search Report dated Sep. 2, 2019 in corresponding Chinese Patent Application No. 201680019618.X (with English Translation), 24 pages.

* cited by examiner

IMAGE PROCESSING DEVICE, IMAGE PROCESSING METHOD, AND IMAGE PROCESSING SYSTEM

TECHNICAL FIELD

The present disclosure relates to image processing devices, image processing methods, and image processing systems.

BACKGROUND ART

Conventionally, various kinds of technologies for cutting out a region of an object such as a detection target person from a captured image have been developed.

For example, Patent Literature 1 describes a technology for detecting moving objects in an image captured by a camera with a fisheye lens and cutting out a circumscribed quadrangle region of each of the detected moving objects. In addition, Patent Literature 2 describes a technology for treating detected people that are detected in a captured image and that have distances between each other that are less than a threshold value as the same group, and cutting out an image along a frame surrounding the same group.

CITATION LIST

Patent Literature

Patent Literature 1: JP 2001-333422A
Patent Literature 2: JP 2012-253723A

DISCLOSURE OF INVENTION

Technical Problem

However, when using the technology described in Patent Literature 1 or Patent Literature 2, the position of the cutout region is limited. For example, according to the technology described in Patent Literature 1, the cutout region is decided always on the basis of a position of a person after moving despite the magnitude of change in the position of the person every time the position of the person changes.

Accordingly, the present disclosure proposes a novel and improved image processing device, image processing method, and image processing system that are capable of deciding a cutout region in accordance with change in the detection position of the same object between frame images captured at different times.

Solution to Problem

According to the present disclosure, there is provided an image processing device including: a first region setting unit configured to set a first region including a detection position of an object in a cutout region in a first frame image; and a cutout region deciding unit configured to decide a cutout region in a second frame image subsequent to the first frame image, on the basis of a positional relation between the first region and a detection position of the object in the second frame image.

In addition, according to the present disclosure, there is provided an image processing method including: setting a first region including a detection position of an object in a cutout region in a first frame image; and deciding a cutout region in a second frame image subsequent to the first frame image, on the basis of a positional relation between the first region and a detection position of the object in the second frame image.

In addition, according to the present disclosure, there is provided an image processing system including: a first region setting unit configured to set a first region including a detection position of an object in a cutout region in a first frame image; a cutout region deciding unit configured to decide a cutout region in a second frame image subsequent to the first frame image, on the basis of a positional relation between the first region and a detection position of the object in the second frame image; a cutout image generation unit configured to generate a cutout image by cutting out the cutout region in the second frame image decided by the cutout region deciding unit, from the second frame image; and a storage unit configured to store the generated cutout image.

Advantageous Effects of Invention

As described above, according to the present disclosure, it is possible to decide a cutout region in accordance with change in the detection position of the same object between frame images captured at different times. Note that the effects described here are not necessarily limited, and any effect described in the present disclosure may be exhibited.

MODE(S) FOR CARRYING OUT THE INVENTION

Figure 1:
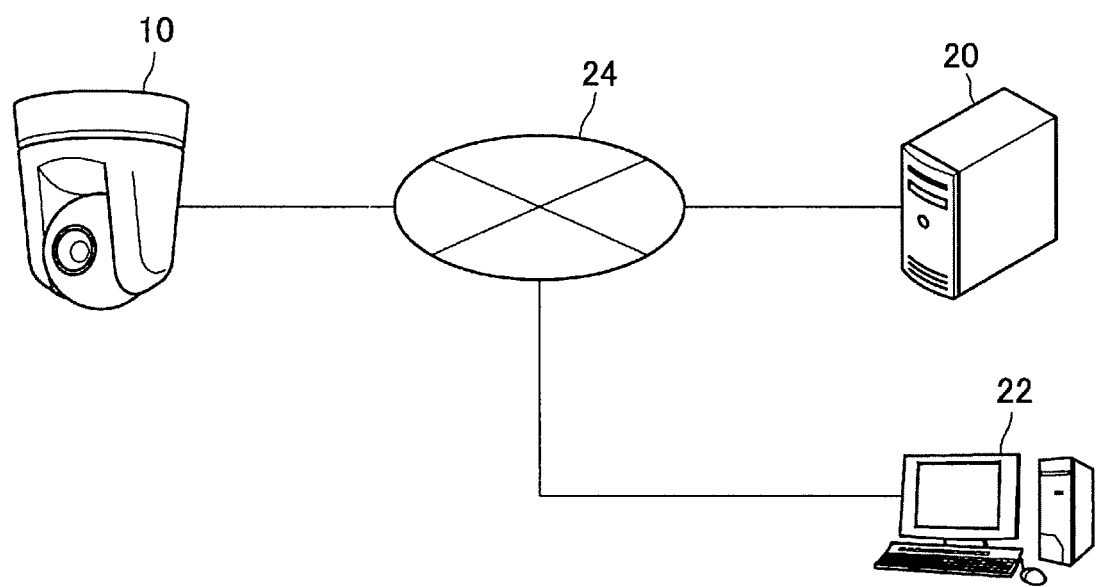
FIG. 1 is an explanatory diagram illustrating a configuration example of an image processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this specification and the drawings, structural elements that have substantially the same function and structure are sometimes distinguished from each other using different alphabets after the same reference numeral. For example, structural elements that have substantially the same function and structure are distinguished into a video cropping unit 106a and a video cropping unit 106b as necessary. However, when there is no need in particular to distinguish structural elements that have substantially the same function and structure, the same reference numeral alone is attached. For example, in a case where it is not necessary to distinguish the video cropping unit 106a and the video cropping unit 106b from each other, they are simply referred to as the video cropping units 106.

In addition, description proceeds in this section "Mode(s) for Carrying Out the Invention" in the following order.
1. Basic configuration of image processing system
2. Detailed description of embodiment
3. Modification «1. Basic Configuration of Image Processing System»

<1-1. Basic Configuration>

As specifically described in "2. Detailed description of embodiment" as an example, the present disclosure may be executed in a variety of forms. First, with reference to FIG. 1, a basic configuration of the image processing system according to the embodiment will be described.

As illustrated in FIG. 1, the image processing system according to the embodiment includes a camera 10, a storage 20, a monitoring terminal 22, and a communication network 24.

[1-1-1. Camera 10]

The camera 10 is an example of the image processing device according to the present disclosure. The camera 10 is a device for capturing moving images of an external environment. The camera 10 may be installed in a place crowded with people and automobiles, a monitoring target place, or the like. For example, the camera 10 may be installed in a road, a station, an airport, a commercial building, an amusement park, a park, a parking lot, a restricted area, or the like.

In addition, the camera 10 is capable of generating another image by using a captured frame image, and transmitting the generated another image to another device via the communication network 24 to be described later. Here, for example, the frame image is an image with the maximum resolution captured by the camera 10. For example, the frame image may be a 4K image.

For example, the camera 10 generates another image with smaller data volume on the basis of the frame image. This is because it is not preferable to transmit the frame image itself to the another device since transmission of the frame image with large data volume takes a long time.

Here, examples of the another image generated by the camera 10 include a shrunken image obtained by simply reducing the resolution of the frame image, and a cropped image obtained by cropping (cutting out) a gaze target region. For example, the shrunken image may be a full HD image.

Figure 2:
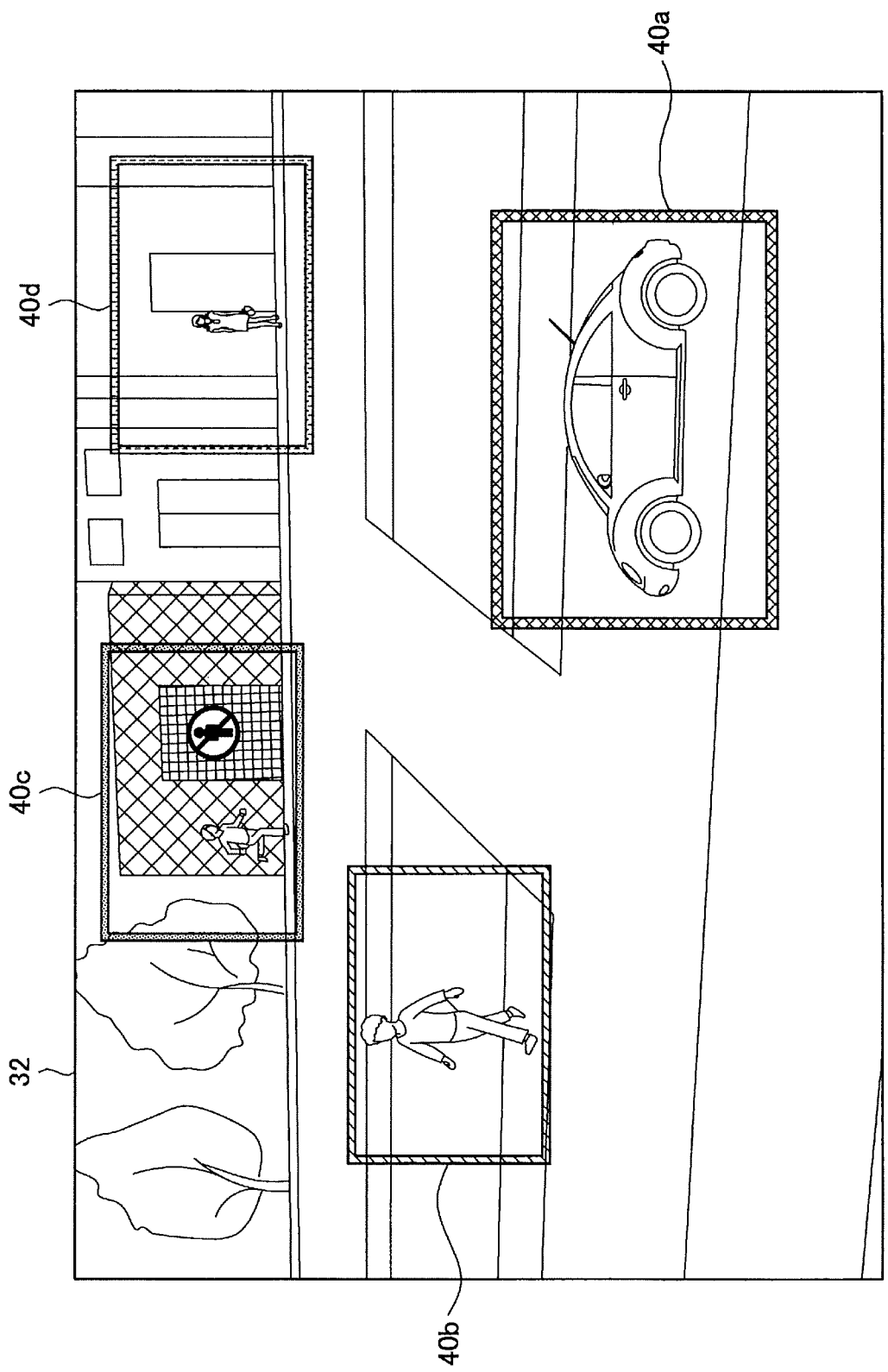
FIG. 2 is an explanatory diagram illustrating an example of a shrunken image 32 generated by a camera 10.

FIG. 2 is an explanatory diagram illustrating an example of a shrunken image (shrunken image 32). The shrunken image 32 includes all regions included in the frame image. However, as illustrated in FIG. 2, the gaze target region such as a face of a person may be so small in the shrunken image 32, and therefore it may be difficult to see the gaze target region. Note that, the regions 40 illustrated in FIG. 2 are regions corresponding to cropping regions to be described later. In general, the cropping region is set to be within a frame image. However, for convenience of description, regions corresponding to the cropping regions in the shrunken image 32 in FIG. 2 are referred to as the regions 40.

Figure 3:
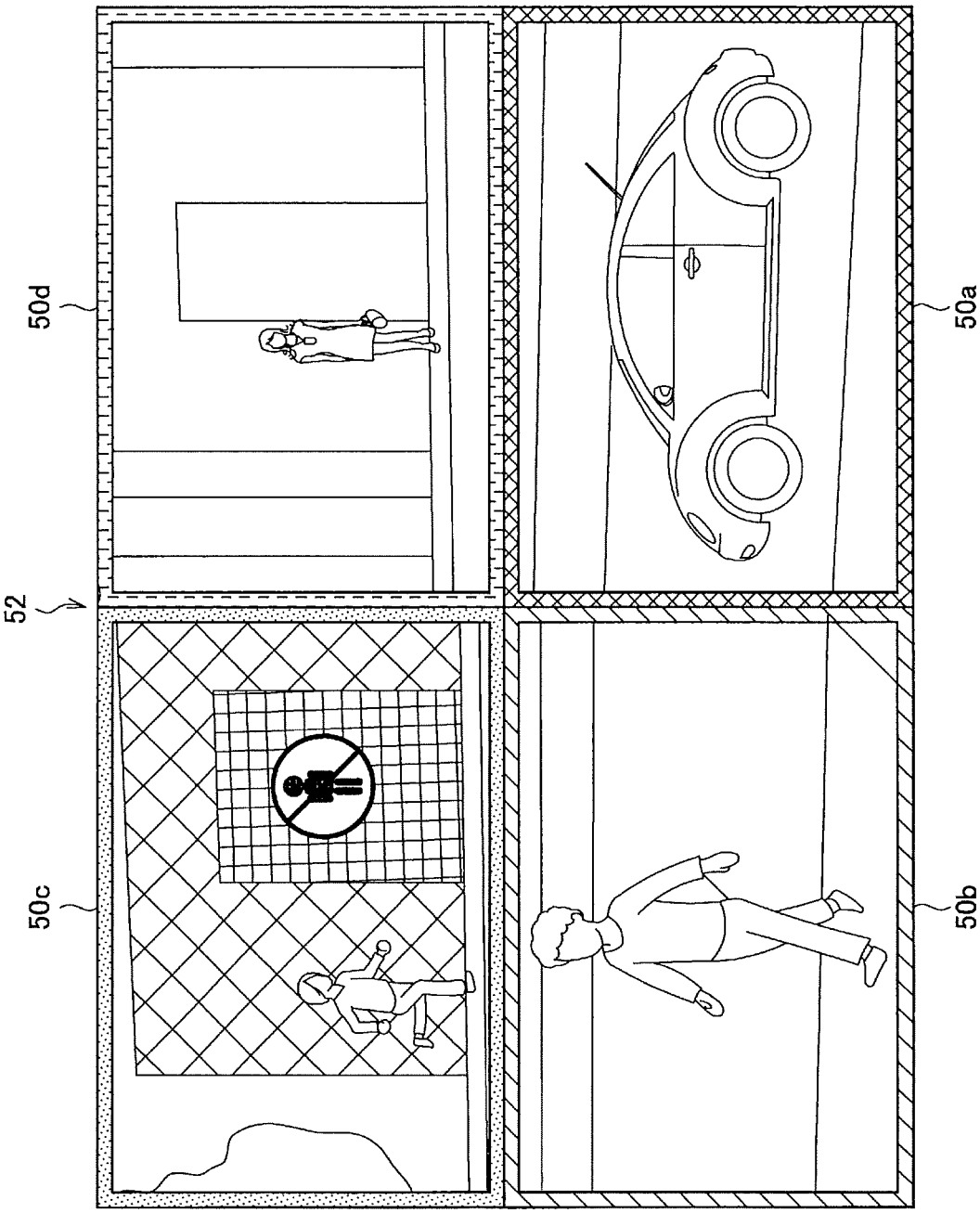
FIG. 3 is an explanatory diagram illustrating an example of a plurality of cropped images 50 generated from a frame image 30.

In addition, FIG. 3 is an explanatory diagram illustrating an example of a plurality of cropped images (a set 52 of the cropped images 50) generated from one frame image. Although the cropped images 50 have the same resolution as the frame image, each of the cropped images 50 includes only a partial region of the frame image, as illustrated in FIG. 3. Accordingly, the camera 10 according to the embodiment basically generates one shrunken image and one or more cropped images from one frame image. In such a generation example, a user can check the entire scene captured by the camera 10 and can check the gaze target region at high resolution. In addition, it is possible to reduce a total data volume in comparison with the frame image.

Figure 4:
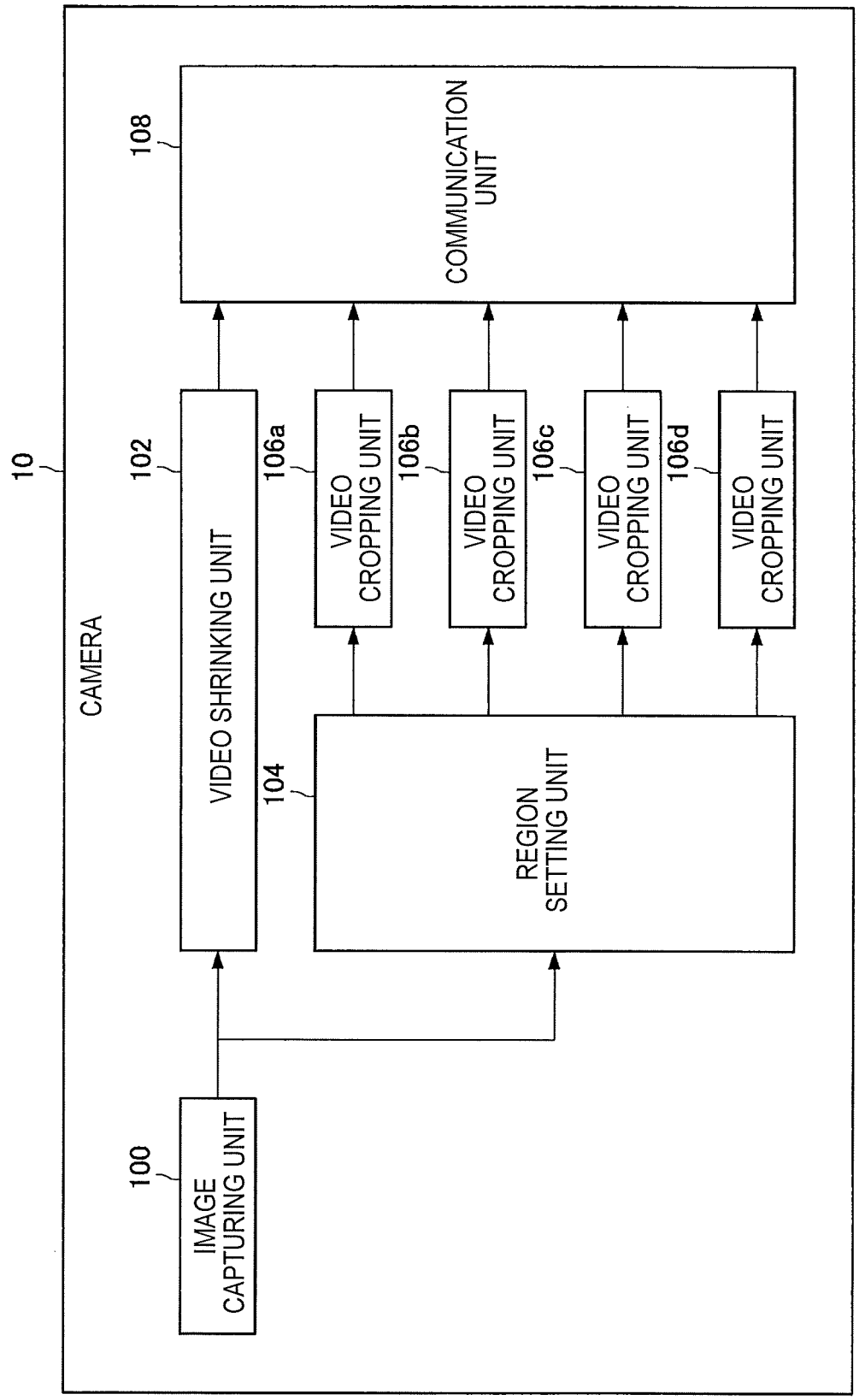
FIG. 4 is a functional block diagram illustrating a configuration of the camera 10 according to the embodiment.

Next, with reference to FIG. 4, an internal configuration of the camera 10 will be described. As illustrated in FIG. 4, the camera 10 includes an image capturing unit 100, a video shrinking unit 102, a region setting unit 104, a plurality of video cropping units 106, and a communication unit 108. Note that, although FIG. 4 shows an example in which there are four video cropping units 106, the number of the video cropping units 106 is not limited thereto. For example, there are any number of the video cropping units 106 as long as the minimum number is one.

(1-1-1-1. Image Capturing Unit 100)

The image capturing unit 100 has a function of acquiring the frame image by causing an image sensor such as a charge-coupled device (CCD) or a complementary metal-oxide-semiconductor (CMOS) to form an image of video of an outside through a lens. For example, the image capturing unit 100 acquires a frame image by capturing video of an outside at a predetermined frame rate.

(1-1-1-2. Video Shrinking Unit 102)

The video shrinking unit 102 generates the shrunken image by shrinking the frame image acquired by the image capturing unit 100 down to a predetermined size.

(1-1-1-3. Region Setting Unit 104)

The region setting unit 104 sets a cropping region in the frame image acquired by the image capturing unit 100. A cropped image is generated on the basis of the cropping region. For example, the region setting unit 104 sets the same number of cropping regions as the number of the video cropping units 106 in the camera 10, in the frame image acquired by the image capturing unit 100.

Figure 5:
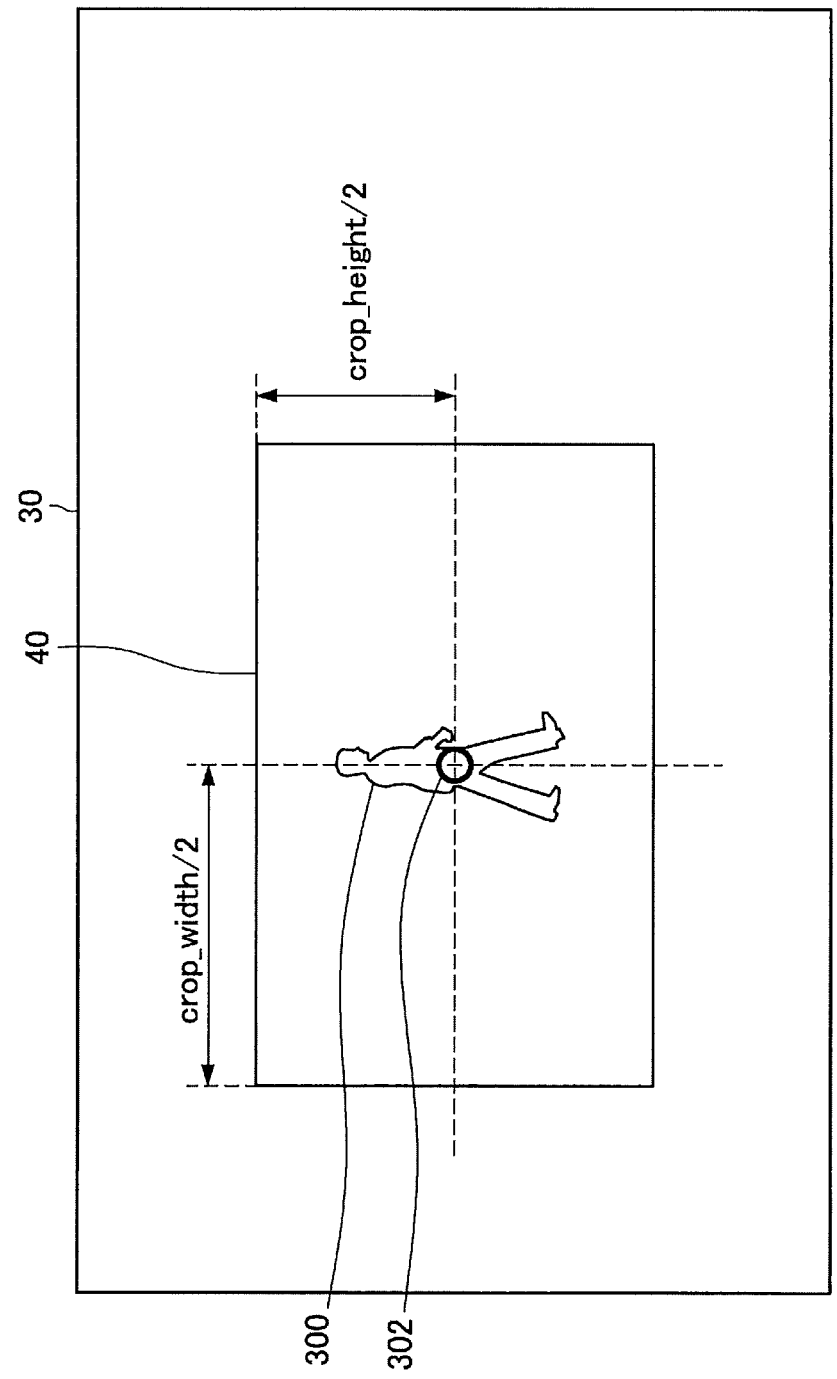
FIG. 5 is an explanatory diagram illustrating a relation between the frame image 30 and a cropping region 40.

FIG. 5 is an explanatory diagram illustrating an example in which the region setting unit 104 sets a cropping region. Note that, in FIG. 5, "crop_width" represents the length of a width of the cropping region, and "crop_height" represents the length of a height of the cropping region.

As illustrated in FIG. 5, the region setting unit 104 detects a detection target object such as a person 300 in the frame image 30, and sets the cropping region 40 on the basis of a detection position 302 of the object.

(1-1-1-4. Video Cropping Unit 106)

The video cropping unit 106 is an example of the cutout image generation unit according to the present disclosure. The video cropping unit 106 generates a cropped image by cutting out the cropping region set by the region setting unit 104 from the frame image acquired by the image capturing unit 100.

For example, FIG. 3 illustrates an example of four cropped images 50 respectively generated by the four video cropping units 106. As illustrated in FIG. 3, for example, the video cropping unit 106a generates a cropped image 50a from a cropping region corresponding to a region 40a illustrated in FIG. 2 that is set by the region setting unit 104. In addition, the video cropping unit 106b generates a cropped image 50b from a cropping region corresponding to a region 40b illustrated in FIG. 2 that is set by the region setting unit 104.

(1-1-1-5. Communication Unit 108)

Via the communication network 24 to be described later, the communication unit 108 exchanges various kinds of information with devices connected with the communication network 24. For example, the communication unit 108 transmits, to the storage 20, the shrunken image acquired by the video shrinking unit 102 and the plurality of cropped images generated by the plurality of video cropping units 106.

[1-1-2. Storage 20]

The storage 20 is a storage device configured to a store shrunken image and cropped images received from the camera 10. For example, the storage 20 stores the received shrunken image and the plurality of received cropped images in association with identification information of the camera 10 and image capturing date and time. Note that, the storage 20 may be installed in a data center, a monitoring center where observers are working, or the like.

[1-1-3. Monitoring Terminal 22]

The monitoring terminal 22 is an information processing terminal configured to display the shrunken image and the cropped images generated by the camera 10. For example, the monitoring terminal 22 may be installed in the monitoring center, and may be used by observers.

Figure 6:
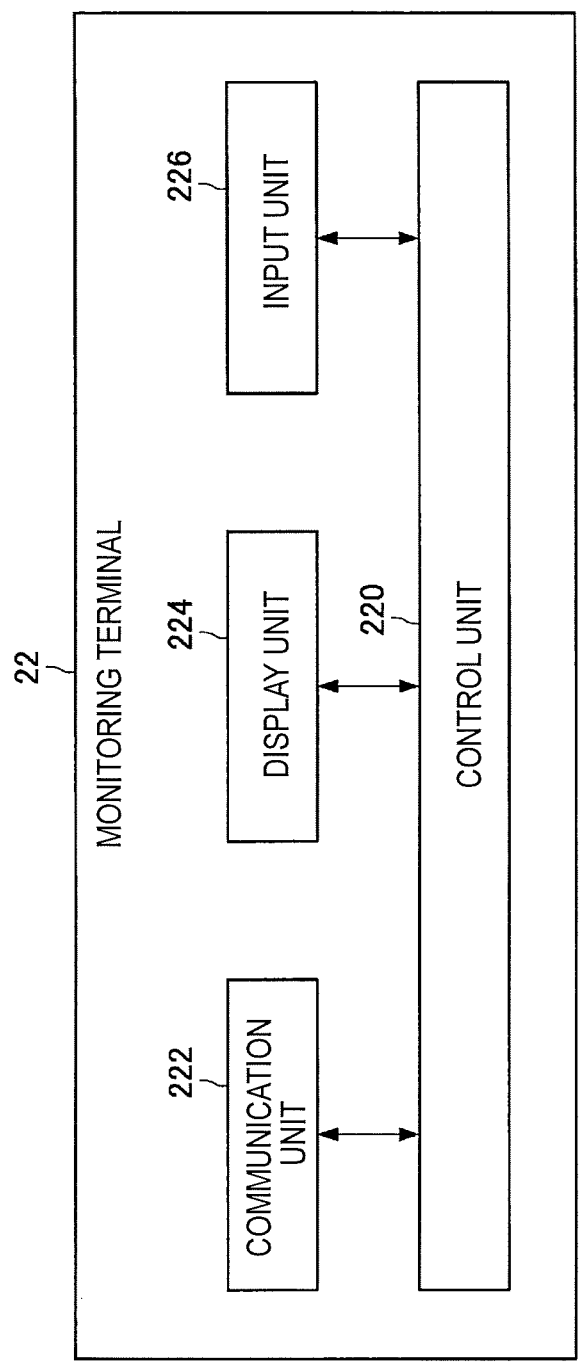
FIG. 6 is a functional block diagram illustrating a configuration of a monitoring terminal 22 according to the embodiment.

Next, details of the configuration of the monitoring terminal 22 will be described. FIG. 6 is a functional block diagram illustrating the configuration of the monitoring terminal 22 according to the embodiment. As illustrated in FIG. 6, the monitoring terminal 22 includes a control unit 220, a communication unit 222, a display unit 224, and an input unit 226.

(1-1-3-1. Control Unit 220)

The control unit 220 controls entire operation of the monitoring terminal 22 by using hardware such as a central processing unit (CPU), random access memory (RAM), and read only memory (ROM) embedded in the monitoring terminal 22.

(1-1-3-2. Communication Unit 222)

Via the communication network 24 to be described later, the communication unit 222 exchanges various kinds of information with devices connected with the communication network 24. For example, the communication unit 222 receives, from the storage 20, the shrunken image and the cropped images stored in the storage 20.

Note that, it is also possible for the communication unit 222 to directly receive the shrunken image and the plurality of cropped images generated by the camera 10 from the camera 10.

(1-1-3-3. Display Unit 224)

For example, the display unit 224 is implemented by a display such as a liquid crystal display (LCD), or an organic light emitting diode (OLED). For example, the display unit 224 displays a monitoring screen including the shrunken image and the cropped images received from the storage 20.

(1-1-3-4. Input Unit 226)

The input unit 226 includes an input device such as a mouse, a keyboard, a touchscreen, or a microphone. The input unit 226 receives various kinds of input performed by the user on the monitoring terminal 22.

[1-1-4. Communication Network 24]

The communication network 24 is a wired or wireless communication channel through which information is transmitted from devices connected with the communication network 24. For example, the communication network 24 may include a public network, various kinds of local area networks (LANs), a wide area network (WAN), and the like. The public network includes the Internet, a satellite communication network, a telephone network, and the like, and the LANs include Ethernet (registered trademark). In addition, the communication network 24 may include a dedicated line network such as an Internet Protocol Virtual Private Network (IP-VPN).

Note that, the image processing system according to the embodiment is not limited to the above described configurations. For example, the storage 20 may be integrated with the monitoring terminal 22. Alternatively, the image processing system does not have to include the storage 20 or the monitoring terminal 22.

<1-2. Organizing of Problems>

As described above, the region setting unit 104 sets a cropping region on the basis of the detection position of the object detected in the frame image.

Examples of a method for setting the cropping region include a method for setting a cropping region such that the detection position of the detection target object is at the center of the cropping region. According to the setting method, it is possible to generate the cropped image such that the user can easily see the detection target object in the cropped image.

However, this setting method includes a problem that the cropped image slightly vibrates when the detection position of the object slightly vibrates in the captured moving image.

To solve this problem, a known technology has proposed a method for smoothing detection positions of an object by using a plurality of past frame images. However, according to the known technology, it is impossible to completely remove the vibration in the case where short smoothing time intervals are set. Therefore, the cropped image still vibrates slightly.

In addition, according to the known technology, the cropped image is affected by the detection position of the object in the past frame image. Therefore, for example, in the case where the object moves fast, the cropped image is generated in which the object seems to move slower than its actual movement.

Therefore, the camera 10 according to the embodiment has been developed in view of the above described circumstance. The camera 10 according to the embodiment is capable of deciding a position of a cropping region in a current frame image in accordance with whether a detection position of an object in the current frame image is within a dead zone region set in a previous frame image.

«2. Detailed Description of Embodiment»

<2-1. Configuration>

The region setting unit 104 is one of the characteristics of the camera 10 according to the embodiment. Next, with reference to FIG. 7, details of the configuration of the region setting unit 104 according to the embodiment will be described.

Figure 7:
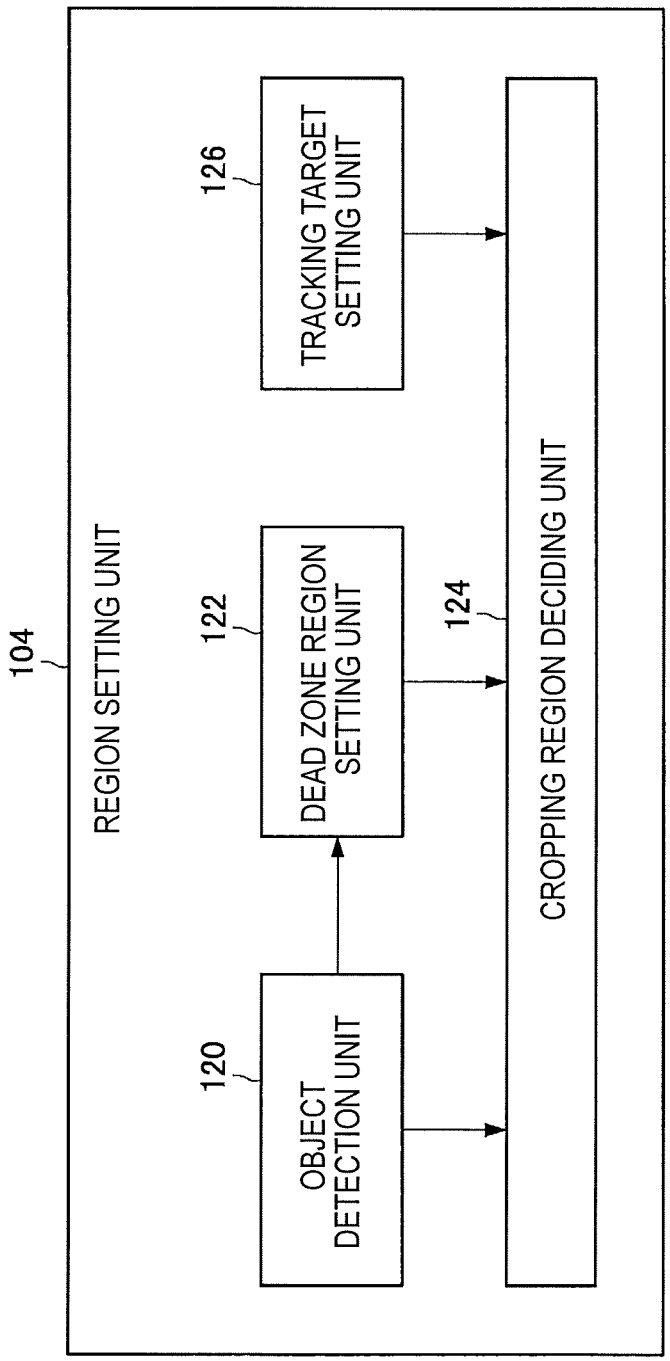
FIG. 7 is a functional block diagram illustrating a configuration of a region setting unit 104 according to the embodiment.

As illustrated in FIG. 7, the region setting unit 104 includes an object detection unit 120, a dead zone region setting unit 122, a cropping region deciding unit 124, and a tracking target setting unit 126.

[2-1-1. Object Detection Unit 120]

The object detection unit 120 detects objects in a frame image acquired by the image capturing unit 100. For example, the object detection unit 120 detects an object of a preset type in the frame image. In addition, for example, the object detection unit 120 detects objects in the acquired frame image. The number of the object is smaller than or equal to the number of the video cropping units 106 in the camera 10. In this case, the types of the detection targets object may include a human and an automobile. In addition, the types of the detection target objects may further include a ship, an airplane, a motorcycle, a bicycle, and the like.

[2-1-2. Dead Zone Region Setting Unit 122]

(2-1-2-1. Setting Example 1)

The dead zone region setting unit 122 is an example of the first region setting unit according to the present disclosure. The dead zone region setting unit 122 sets a dead zone region on the basis of whether the frame image acquired by the image capturing unit 100 (hereinafter, referred to as a current frame image) is a frame image of an initial frame (hereinafter, referred to as an initial frame image). For example, in the case where the current frame image is the initial frame image, the dead zone region setting unit 122 sets a dead zone region in the current frame image such that a detection position of an object detected by the object detection unit 120 in the current frame image is at the center of the dead zone region.

Here, the initial frame image may be a frame image of an initial frame in which generation of a cropped image starts. In addition, the dead zone region is an example of the first region according to the present disclosure. Note that, the dead zone region is a region used for deciding a position of a cropping region in a current frame image on the basis of a positional relation with a detection position of an object in the current frame image. Details of the dead zone region will be described later.

Figure 8:
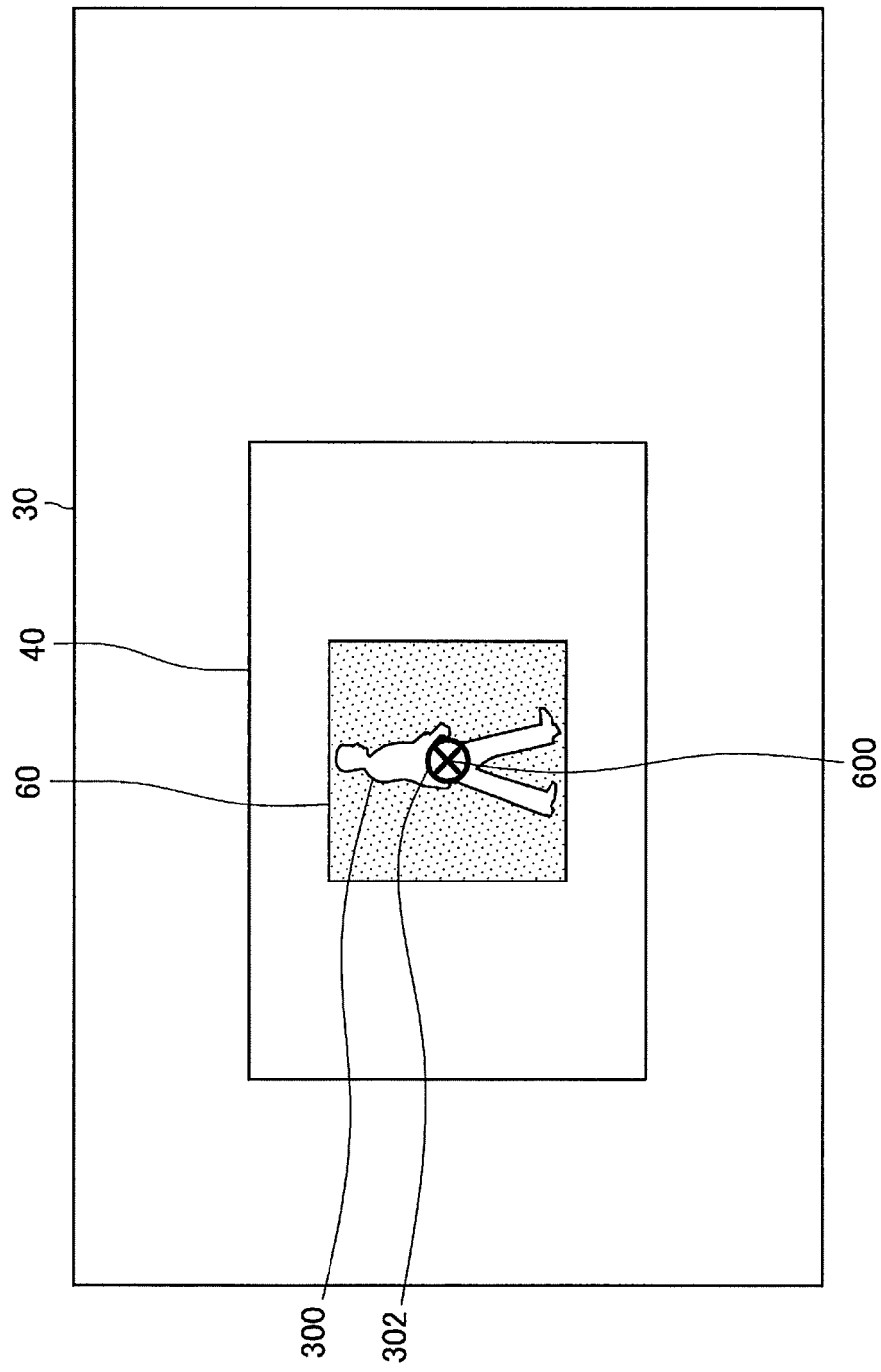
FIG. 8 is an explanatory diagram illustrating an example of setting a dead zone region 60 according to the embodiment.

Next, with reference to FIG. 8, details of the function of the dead zone region setting unit 122 will be described. FIG. 8 is an explanatory diagram illustrating an example of setting a dead zone region 60 and a cropping region 40 in the case where the current frame image is the initial frame image. For example, in the case where the current frame image is the initial frame image and the person 300 illustrated in FIG. 8 is a detection target object, the dead zone region setting unit 122 sets the dead zone region 60 in the current frame image such that the detection position 302 of the person detected by the object detection unit 120 is at the center 600 of the dead zone region 60.

Note that, although details will be described later, hereinafter the center of the cropped image is set such that the center of the cropped image is not the same as the object detection position 302 but is the same as the center 600 of the dead zone region 60. In other words, even if the object detection position 302 moves from the center 600 of the dead zone region 60 in a subsequent frame, the center of the cropping region 40 is set at the same position as the center 600 of the dead zone region 60.

(2-1-2-2. Setting Example 2)

Case 1

In addition, in the case where the current frame image is a frame image of a frame subsequent to the initial frame, the dead zone region setting unit 122 sets a dead zone region on the basis of whether a dead zone region in a previous frame image includes a detection position of an object in the current frame image. For example, in the case where the dead zone region in the previous frame image includes the detection position of the object in the current frame image, the dead zone region setting unit 122 sets a position of the dead zone region in the current frame image at the same position as the dead zone region in the previous frame image. Note that, since the positions of the dead zone regions are the same, the position of the cropping region also becomes the same as the previous frame image. Details thereof will be described later.

Figure 9:
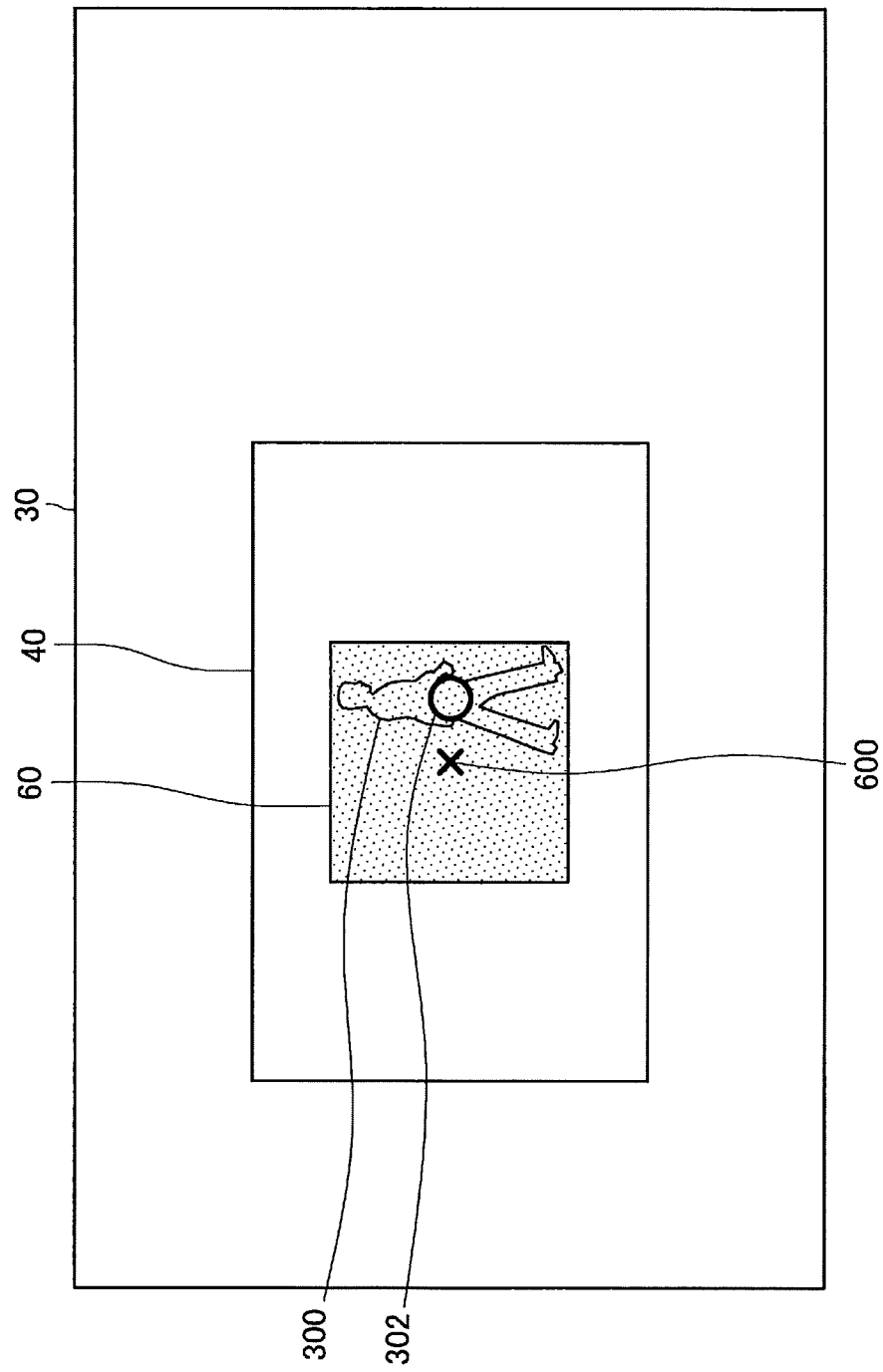
FIG. 9 is an explanatory diagram illustrating an example of deciding a cropping region in the case where a detection position of a person is changed according to the embodiment.

Next, with reference to FIG. 9, details of the above described functions will be described. FIG. 9 is an explanatory diagram illustrating an example of setting a dead zone region 60 and a cropping region 40 in the case where the current frame image is a frame image other than the initial frame image. In the case where the person 300 in the example illustrated in FIG. 9 is a detection target object, the detection position 302 of the person is included in the dead zone region 60 in the previous frame image as illustrated in FIG. 9. Therefore, the dead zone region setting unit 122 sets a position of the dead zone region in the current frame image at the same position as the dead zone region 60 in the previous frame image.

Case 2

In addition, in the case where the dead zone region in the previous frame image does not include the detection position of the object in the current frame image, the dead zone region setting unit 122 sets the dead zone region in the current frame image by moving the dead zone region in the previous frame image such that the detection position of the object in the current frame image is within the outline of the dead zone region. In this case, for example, the dead zone region setting unit 122 sets the dead zone region in the current frame image by moving the dead zone region in the previous frame image in a direction of the detection position of the object in the current frame image by the minimum distance between the outline of the dead zone region in the previous frame image and the detection position of the object in the current frame image.

Figure 10:
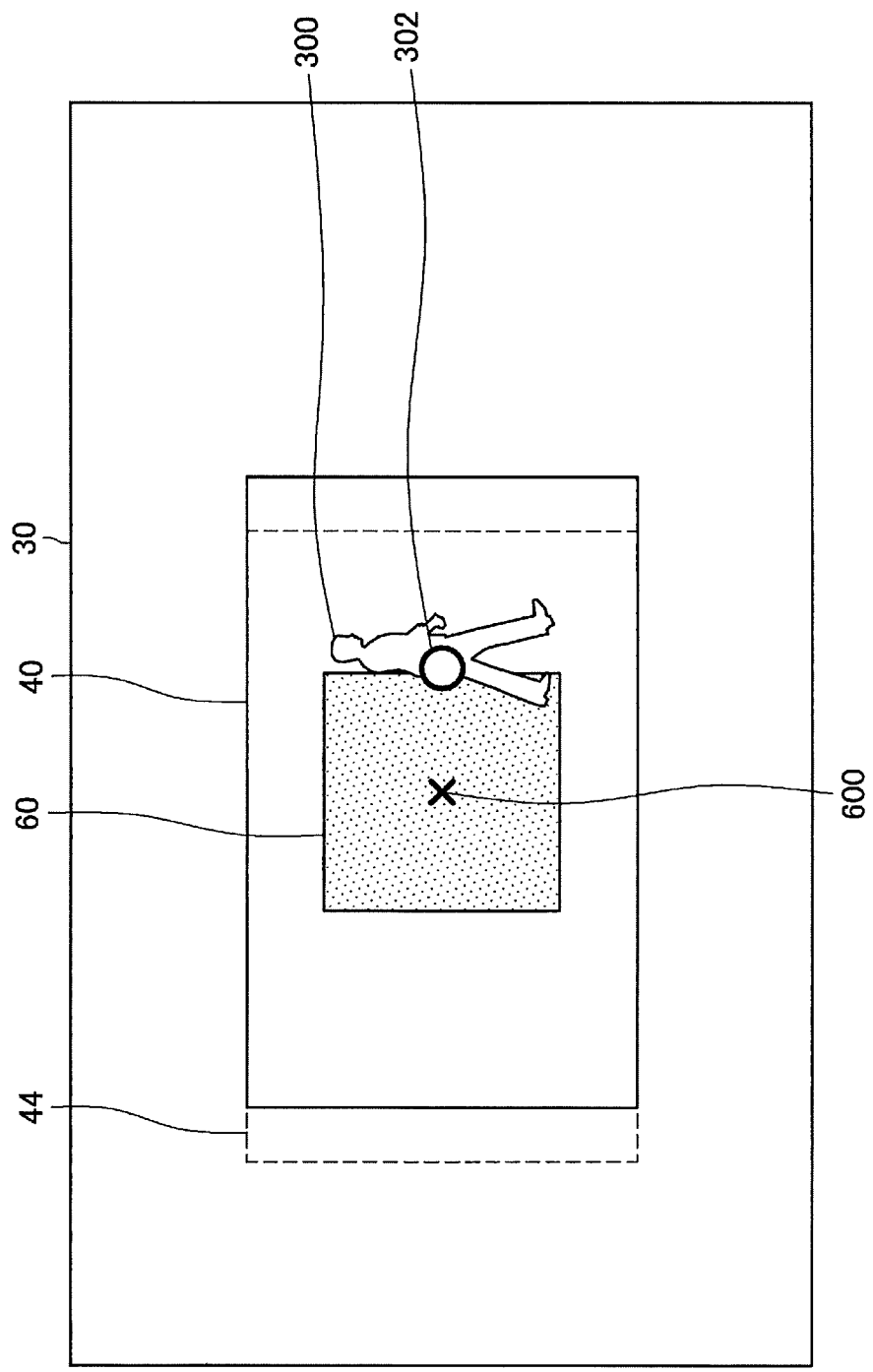
FIG. 10 is an explanatory diagram illustrating another example of deciding a cropping region in the case where a detection position of a person is changed according to the embodiment.

Next, with reference to FIG. 10, details of the above described functions will be described. FIG. 10 is an explanatory diagram illustrating another example of setting a dead zone region 60 and a cropping region 40 in the case where the current frame image is a frame image other than the initial frame image. In the case where the person 300 in the example illustrated in FIG. 10 is a detection target object, the detection position 302 of the person is not included in the dead zone region in the previous frame image. Therefore, as illustrated in FIG. 10, the dead zone region setting unit 122 sets the dead zone region 60 in the current frame image 30 such that the detection position 302 of the person overlaps the outline of the dead zone region 60. For example, according to the setting example, in the case where the object is out of the dead zone region set in the previous frame image such as the case where the object moves fast, the dead zone region approaches the detection position of the object by the distance of the object out of the outline of the dead zone region in the previous frame image. Accordingly, it is possible to set the dead zone region in the current frame image such that the detection position of the object is not out of the dead zone region surrounded by the outline.

Note that, even in the case where a detection position of the object detected in a next frame image is out of the dead zone region in the current frame image, it is also possible for the dead zone region setting unit 122 to set the dead zone region in the next frame image such that the detection position of the object is not out of the dead zone region surrounded by the outline. In other words, the dead zone region setting unit 122 sets the dead zone region in a positional relation such that the dead zone region follows the object every time the position of the object goes out of the dead zone region.

Note that, the dead zone region may have a rectangular shape or a circular shape, for example. In addition, the dead zone region has a predetermined size. For example, in the case where the dead zone region has the rectangular shape, the width of the dead zone region may be in a range from a length of few pixels to half of the width of the cropping region. In addition, the height of the dead zone region may be in a range from a length of few pixels to half of the height of the cropping region.

Note that, it is assumed that the size of the dead zone region is basically set in advance. However, it is also possible for an administrator to appropriately change the size of the dead zone region, for example.

(2-1-2-2. Setting Example 2)

Note that, in the case where the current frame image includes a plurality of objects, the dead zone region setting unit 122 sets a dead zone region on the basis of a detection position of an object set as a tracking target by the tracking target setting unit 126 (to be described later), for example.

For example, in the case where the dead zone region in the previous frame image includes the detection position of the object set as the tracking target (in the current frame image), the dead zone region setting unit 122 sets a position of the dead zone region in the current frame image at the same position as the dead zone region in the previous frame image. In addition, in the case where the dead zone region in the previous frame image does not include the detection position of the object of the object set as the tracking target (in the current frame image), the dead zone region setting unit 122 sets the dead zone region in the current frame image by moving the dead zone region in the previous frame image such that the detection position of the object set as the tracking target (in the current frame image) is within the outline of the dead zone region.

[2-1-3. Cropping Region Deciding Unit 124]

(2-1-3-1. Decision Example 1)

The cropping region deciding unit 124 is an example of the cutout region deciding unit according to the present disclosure. The cropping region deciding unit 124 sets a cropping region in the current frame image in accordance with whether the current frame image is the initial frame image. For example, in the case where the current frame image is the initial frame image, the cropping region deciding unit 124 sets a cropping region in the current frame image such that a detection position of an object detected by the object detection unit 120 in the current frame image is at the center of the cropping region.

For example, in the example illustrated in FIG. 8, the cropping region deciding unit 124 sets the cropping region 40 in the current frame image 30 such that the detection position 302 of the person detected by the object detection unit 120 is at the center of the cropping region 40.

(2-1-3-2. Decision Example 2)

Case 1

For example, in the case where the current frame image is a frame image other than the initial frame image, the cropping region deciding unit 124 sets a cropping region in the current frame image on the basis of a positional relation between the detection position of the object detected by the object detection unit 120 and the dead zone region in the previous frame image. For example, in the case where the dead zone region in the previous frame image includes the detection position of the object detected by the object detection unit 120, the cropping region deciding unit 124 decides to make the position of the cropping region in the current frame image the same as the position of the cropping region in the previous frame image. Note that, the shape and the size of the cropping region in the current frame image is basically set to be the same as the shape and the size of the cropping region in the previous frame image.

In the example illustrated in FIG. 9, the detection position 302 of the person is included in the dead zone region 60 in the previous frame image. Therefore, the cropping region deciding unit 124 decides to make the position of the cropping region 40 in the current frame image 30 the same as the position of the cropping region in the previous frame image.

According to such decision example, the position of the cropping region does not vary between frames in which the detection positions of the object are within the dead zone region set in the initial frame image. In other words, even when the object slightly vibrates, the position of the cropping region does not vary unless the object goes out of the dead zone region. Therefore, it is possible to improve visibility of the cropped images.

Case 2

In addition, in the case where the dead zone region in the previous frame image does not include the detection position of the object detected by the object detection unit 120, the cropping region deciding unit 124 decides the cropping region in the current frame image such that the center of the dead zone region set by the dead zone region setting unit 122 (in the current frame image) is at the center of the cropping region.

In the example illustrated in FIG. 10, the cropping region deciding unit 124 decides the cropping region 40 in the current frame image 30 such that the center 600 of the dead zone region 60 set by the dead zone region setting unit 122 in the current frame image 30 is at the center of the cropping region 40. Note that, a dashed rectangular 44 in FIG. 10 represents the cropping region in the previous frame image. As illustrated in FIG. 10, the position of the cropping region 44 in the previous frame image is different from the position of the cropping region 40 in the current frame image 30.

(2-1-3-3. Decision Example 3)

Note that, for example, in the case where the current frame image includes a plurality of objects, the cropping region deciding unit 124 is capable of deciding a position of a cropping region in the current frame image on the basis of a positional relation between a detection position of an object set as a tracking target by the tracking target setting unit 126 (to be described later) and a dead zone region set with regard to the tracking target object.

For example, in the case where the dead zone region set with regard to the object includes the detection position of the object set as the tracking target by the tracking target setting unit 126, the cropping region deciding unit 124 decides to make the position of the cropping region in the current frame image the same as the position of the cropping region in the previous frame image. In addition, in the case where the dead zone region in the previous frame image set with regard to the object does not include the detection position of the object set as the tracking target by the tracking target setting unit 126, the cropping region deciding unit 124 decides the cropping region in the current frame image such that the center of the dead zone region set with regard to the object in the current frame image is at the center of the cropping region.

[2-1-4. Tracking Target Setting Unit 126]

The tracking target setting unit 126 sets the tracking target object on the basis of a result of detection of the object performed by the object detection unit 120. For example, the tracking target setting unit 126 sets the tracking target object in the current frame image on the basis of a distance between a specific position set in an image capturing region such as a monitoring target position and a detection position of an object detected by the object detection unit 120.

For example, the tracking target setting unit 126 sets the tracking target object in the current frame image to the tracking target object in the previous frame image in the case where the distance between the specific position set in the image capturing range and the detection position of the object detected by the object detection unit 120 is within a predetermined distance. On the other hand, the tracking target setting unit 126 sets the tracking target object in the current frame image to an object different from the tracking target object in the previous frame image in the case where the distance between the specific position set in the image capturing range and the detection position of the object detected by the object detection unit 120 exceeds the predetermined distance. For example, the object different from the tracking target object in the previous frame image may be an object closest to the specific position.

<2-2. Operation>

The configurations according to the embodiment have been described above. Next, with reference to FIG. 11 to FIG. 13, operation according to the embodiment will be described. Note that, an operation example will be described in which the camera 10 includes four video cropping units 106 and one shrunken image and four cropped images are generated from one frame image. Note that, this operation repeats at a predetermined frame rate.

[2-2-1. Overall Operation]

Figure 11:
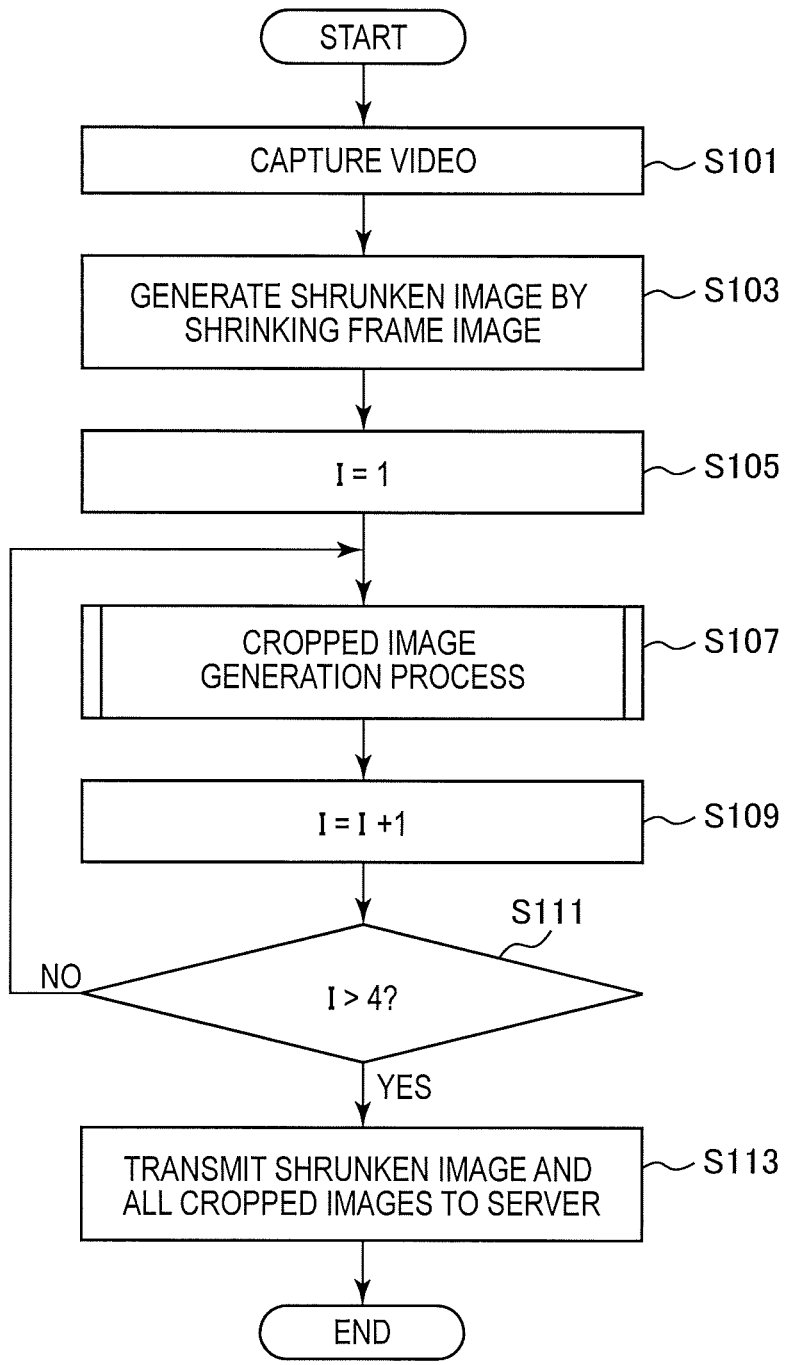
FIG. 11 is a flowchart illustrating operation according to the embodiment.

FIG. 11 is a flowchart illustrating an operation example according to the embodiment. As illustrated in FIG. 11, first, the image capturing unit 100 of the camera 10 acquires a frame image by capturing video of an outside when a predetermined image capturing timing comes (S101).

Next, the video shrinking unit 102 generates a shrunken image by shrinking the frame image acquired in S101 (hereinafter, referred to as current frame image) down to a predetermined size (S103).

Subsequently, the camera 10 performs a "cropped image generation process" (to be described later) the same number of times as the number of the video cropping units 106 (in other words, four times) (S105 to S111).

Next, the communication unit 108 transmits the shrunken image generated in S103 and the four cropped images generated in S107 to the storage 20 (S113).

[2-2-2. Cropped Image Generation Process]

Figure 12:
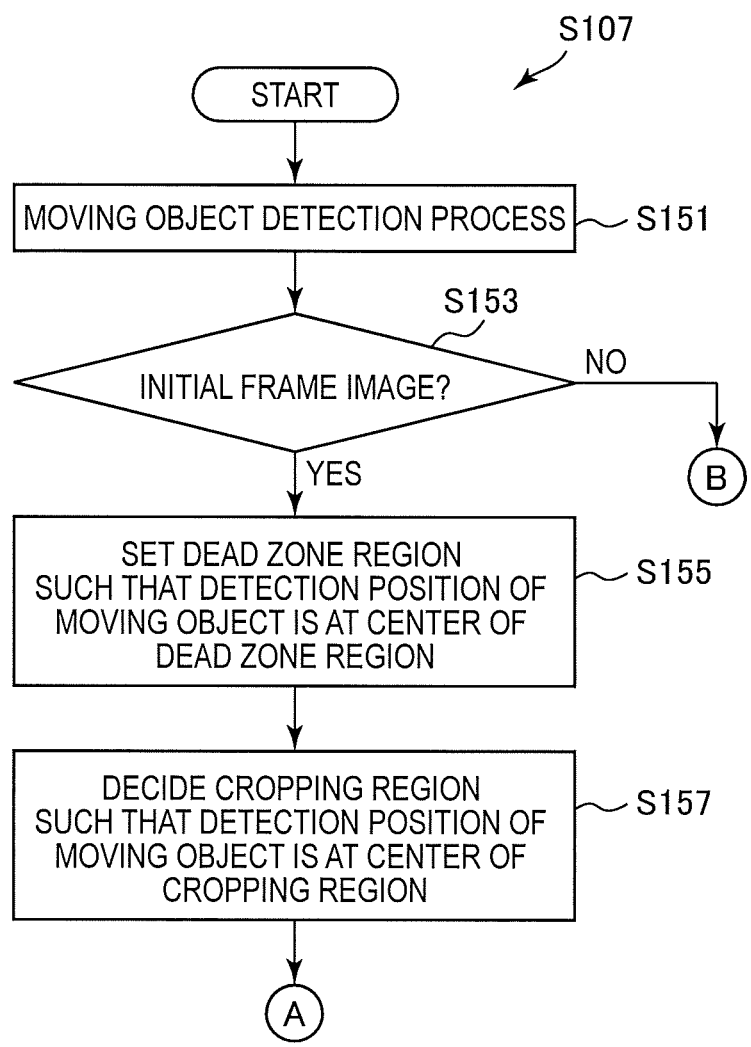
FIG. 12 is a flowchart illustrating a part of operation of a cropped image generation process according to the embodiment.
Figure 13:
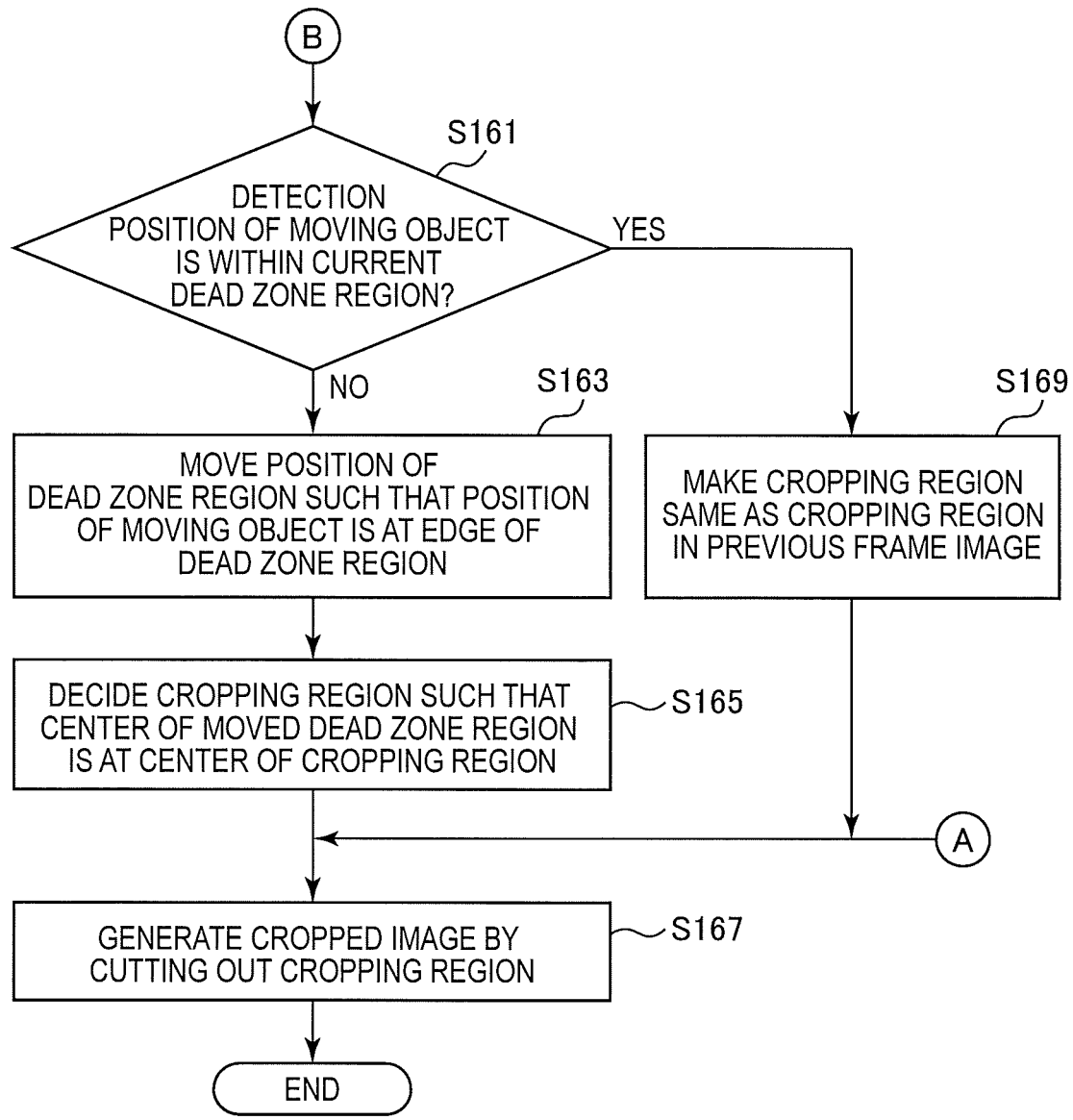
FIG. 13 is a flowchart illustrating a part of operation of the cropped image generation process according to the embodiment.

Next, with reference to FIG. 12 to FIG. 13, details of operation in the "cropped image generation process" in S107 will be described. As illustrated in FIG. 12, the object detection unit 120 of the camera 10 first detects a detection target object in the current frame image (S151).

Next, in the case where the current frame image is the initial frame image (Yes in S153), the dead zone region setting unit 122 sets a dead zone region in the current frame image such that the detection position of the object detected in S151 is at the center of the dead zone region (S155).

Subsequently, the cropping region deciding unit 124 decides the cropping region in the current frame image such that the detection position of the object detected in S151 is at the center of the cropping region (S157). Next, the camera 10 performs operation in S167 to be described later.

Next, with reference to FIG. 13, an example of operation performed in the case where the current frame image is not the initial frame image (No in S153) will be described. As illustrated in FIG. 13, the dead zone region setting unit 122 first determines whether the detection position of the object detected in S151 is within the dead zone region in the previous frame image (S161).

In the case where the dead zone region in the previous frame image includes the detection position of the object (Yes in S161), the dead zone region setting unit 122 sets a position of the dead zone region in the current frame image to the same position as the dead zone region in the previous frame image. Next, the cropping region deciding unit 124 decides to make the position of the cropping region in the current frame image the same as the position of the cropping region in the previous frame image (S169). Next, the camera 10 performs operation in S167 to be described later.

On the other hand, in the case where the detection position of the object is out of the dead zone region in the previous frame image (No in S161), the dead zone region setting unit 122 sets the dead zone region in the current frame image by moving the dead zone region in the previous frame image such that the detection position of the object in the current frame image is within the outline of the dead zone region (S163).

Next, the cropping region deciding unit 124 decides the cropping region in the current frame image such that the center of the dead zone region set in S163 (in the current frame image) is at the center of the cropping region (S165).

Subsequently, the video cropping unit 106 generates a cropped image by cutting out the cropping region decided in S157, S165, or S169 from the current frame image (S167).

<2-3. Effects>

[2-3-1. Effect 1]

For example, as described with reference to FIG. 4, FIG. 7, FIG. 11 to FIG. 13, and the like, the camera 10 according to the embodiment decides a cropping region in a current frame image on the basis of a positional relation between a detection position of an object in the current frame image and a dead zone region set in a previous frame image. Therefore, it is possible to decide a cutout region in accordance with a magnitude of change in the detection position of the object between the current frame image and the previous frame image.

For example, in the case where the dead zone region in the previous frame image includes the detection position of the object detected in the current frame image, the camera 10 decides to make the position of the cropping region in the current frame image the same as the position of the cropping region in the previous frame image. Therefore, the position of the cropping region does not vary between frames in which the detection positions of the object are within the dead zone region set in the initial frame image. In other words, even when the object slightly vibrates, the position of the cropping region does not vary unless the object goes out of the dead zone region. Therefore, it is possible to improve visibility of the cropped images.

In addition, in comparison with known technologies, it is possible to eliminate a small vibration of a cropped image without performing a smoothing process in a temporal direction.

[2-3-2. Effect 2]

In addition, for example, in the case where the detection position of the object is out of the dead zone region set in the previous frame image such as the case where the object moves fast, the camera 10 moves the dead zone region closer to the detection position of the object by the distance of the object out of the outline of the dead zone region in the previous frame image. Next, the camera 10 decides the cropping region in the current frame image such that the center of the moved dead zone region is at the center of the cropping region. Therefore, it is possible to set the dead zone region at a position in contact with the object even in the case where the object moves fast. Accordingly, the user feels as if the object moves smoothly between the successive cropped images, and high visibility can be obtained.

[2-3-3. Effect 3]

In addition, since the method for deciding a cropping region by the cropping region deciding unit 124 is simple, the camera 10 can generate cropped images in real time.

[2-3-4. Effect 4]

In addition, according to the embodiment, it is possible to generate a shrunken image and cropped images simply by using the camera 10. Accordingly, the camera 10 does not have to transmit the frame image to another device such as a server to generate the shrunken image and the cropped images, and it is possible to reduce communication traffic.

«3. Modification»

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

<3-1. Modification 1>

In the above described embodiment, the example in which the camera 10 serves as the image processing device according to the present disclosure has been described. However, the present disclosure is not limited thereto. For example, the monitoring terminal 22 may serve as the image processing device according to the present disclosure in the case where (the control unit 220 of) the monitoring terminal 22 includes all the video shrinking unit 102, the region setting unit 104, and the plurality of video cropping units 106 instead of the camera 10.

Alternatively, a separately-provided server (not illustrated) may serve as the image processing device according to the present disclosure in the case where the server is capable of communicating with the camera 10 via the communication network 24 and the server includes all the video shrinking unit 102, the region setting unit 104, and the plurality of video cropping units 106 instead of the camera 10. In addition, the server may be integrated with the storage 20.

<3-2. Modification 2>

In addition, according to the above described embodiment, it is also possible to provide a computer program for causing a hardware such as a CPU, ROM, and RAM to execute functions equivalent to the video shrinking unit 102, the region setting unit 104, and the video cropping units 106 described above. Moreover, it may be possible to provide a recording medium having the computer program stored therein.

Additionally, the present technology may also be configured as below.

(1)

An image processing device including:

a first region setting unit configured to set a first region including a detection position of an object in a cutout region in a first frame image; and a cutout region deciding unit configured to decide a cutout region in a second frame image subsequent to the first frame image, on the basis of a positional relation between the first region and a detection position of the object in the second frame image.

(2)

The image processing device according to (1), in which the cutout region deciding unit decides whether to make a position of the cutout region in the second frame image the same as the cutout region in the first frame image, on the basis of the positional relation between the first region and the detection position of the object in the second frame image.

(3)

The image processing device according to (2), in which, in the case where the first region includes the detection position of the object in the second frame image, the cutout region deciding unit decides to make the position of the cutout region in the second frame the same as the cutout region in the first frame image.

(4)

The image processing device according to (2) or (3), in which in the case where the first region does not include the detection position of the object in the second frame image, the first region setting unit moves the position of the first region such that the detection position of the object in the second frame image overlaps an outline of the first region, and the cutout region deciding unit decides the cutout region in the second frame image by setting a center of the moved first region to a center of the cutout region in the second frame image.

(5)

The image processing device according to (4), in which a shape and a size of the cutout region in the second frame image are the same as a shape and a size of the cutout region in the first frame image.

(6)

The image processing device according to (5), in which a position of a center of the cutout region in the first frame image and a position of a center of the first region are the same as the detection position of the object in the first frame image.

(7)

The image processing device according to any one of (2) to (6), in which the first region setting unit sets a first region including a detection position of each of a plurality of objects in the cutout region in the first frame image, the image processing device further includes a tracking target setting unit configured to set any one of the plurality of objects as a tracking target, and the cutout region deciding unit decides whether to make the position of the cutout region in the second frame image the same as the cutout region in the first frame image, on the basis of a positional relation between a detection position of a tracking target object set by the tracking target setting unit and the first region set with respect to the tracking target object.

(8)

The image processing device according to any one of (2) to (7), further including a cutout image generation unit configured to generate a cutout image by cutting out the cutout region in the second frame image decided by the cutout region deciding unit, from the second frame image.

(9)

The image processing device according to any one of (2) to (8), in which the object is a human or an automobile.

(10)

An image processing method including:

setting a first region including a detection position of an object in a cutout region in a first frame image; and deciding a cutout region in a second frame image subsequent to the first frame image, on the basis of a positional relation between the first region and a detection position of the object in the second frame image.

(11)

An image processing system including:

a first region setting unit configured to set a first region including a detection position of an object in a cutout region in a first frame image;

a cutout region deciding unit configured to decide a cutout region in a second frame image subsequent to the first frame image, on the basis of a positional relation between the first region and a detection position of the object in the second frame image;

a cutout image generation unit configured to generate a cutout image by cutting out the cutout region in the second frame image decided by the cutout region deciding unit, from the second frame image; and a storage unit configured to store the generated cutout image.

REFERENCE SIGNS LIST 10 camera
20 storage
22 monitoring terminal
24 communication network
100 image capturing unit
102 video shrinking unit
104 region setting unit
106 video cropping unit
108 communication unit
120 object detection unit
122 dead zone region setting unit
124 cropping region deciding unit
126 tracking target setting unit
220 control unit
222 communication unit
224 display unit
226 input unit

The invention claimed is:

1. An image processing device comprising:
processing circuitry configured to:
set a first region including a first detection position of a moving object in a first frame image, the first detection position initially being at the center of the first region;
when the first region in the first frame image does not include a second detection position of the moving object in a second frame image that is subsequent to the first frame image, move the first region in the first frame image in a direction of the second detection position of the moving object by the minimum distance between an outline of the first region and the second detection position such that the second detection position is on the outline of the first region, the second detection position being the middle of the moving object;
set a cutout region in the second frame image based on the first region that is moved; and
generate a cutout image by cutting out the cutout region in the second frame image.

2. The image processing device according to claim 1, wherein the processing circuitry is further configured to determine whether to set a position of the cutout region in the second frame image the same as the cutout region in the first frame image based on a positional relation between the first region and the second detection position of the moving object in the second frame image.

3. The image processing device according to claim 2, wherein when the first region includes the second detection position of the moving object in the second frame image, the processing circuitry is further configured to set the position of the cutout region in the second frame image the same as the cutout region in the first frame image.

4. The image processing device according to claim 1, wherein a first shape and a first size of the cutout region in the first frame image are the same as a second shape and a second size of the cutout region in the second frame image.

5. The image processing device according to claim 4, wherein a first position of the center of the cutout region in the first frame image and a second position of the center of the first region are the same as the first detection position of the moving object in the first frame image.

6. The image processing device according to claim 2, wherein
the processing circuitry is configured to set the first region including a detection position of each of a plurality of moving objects in the cutout region in the first frame image,
set one of the plurality of moving objects as a tracking target, and
determine whether to set the position of the cutout region in the second frame image the same as the cutout region in the first frame image, based on a positional relation between a detection position of the tracking target and the first region.

7. The image processing device according to claim 2, wherein the moving object is a human or an automobile.

8. An image processing method comprising:
setting a first region including a first detection position of a moving object in a first frame image, the first detection position initially being at the center of the first region;
when the first region in the first frame image does not include a second detection position of the moving object in a second frame image that is subsequent to the first frame image, moving the first region in the first frame image in a direction of the second detection position of the moving object by the minimum distance between an outline of the first region and the second detection position such that the second detection position is on the outline of the first region, the second detection position being the middle of the moving object;

setting a cutout region in the second frame image based on the first region that is moved; and generating a cutout image by cutting out the cutout region in the second frame image.

9. An image processing system comprising:

processing circuitry configured to:
  set a first region including a first detection position of a moving object in a first frame image, the first detection position initially being at the center of the first region,
  when the first region in the first frame image does not include a second detection position of the moving object in a second frame image that is subsequent to the first frame image, move the first region in the first frame image in a direction of the second detection position of the moving object by the minimum distance between an outline of the first region and the second detection position such that the second detection position is on the outline of the first region, the second detection position being the middle of the moving object,
  set a cutout region in the second frame image based on the first region that is moved,
  generate a cutout image by cutting out the cutout region in the second frame image; and
a storage configured to store the generated cutout image.

10. The image processing method according to claim 8, further comprising:
  determining whether to set a position of the cutout region in the second frame image the same as the cutout region in the first frame image based on a positional relation between the first region and the second detection position of the moving object in the second frame image.

11. The image processing method according to claim 8, further comprising:
  when the first region includes the second detection position of the moving object in the second frame image, setting a position of the cutout region in the second frame image the same as the cutout region in the first frame image.

12. The image processing method according to claim 8, wherein a first shape and a first size of the cutout region in the first frame image are the same as a second shape and a second size of the cutout region in the second frame image.

13. The image processing method according to claim 8, wherein a first position of the center of the cutout region in the first frame image and a second position of the center of the first region are the same as the first detection position of the moving object in the first frame image.

14. The image processing system according to claim 9, wherein the processing circuitry is further configured to determine whether to set a position of the cutout region in the second frame image the same as the cutout region in the first frame image based on a positional relation between the first region and the second detection position of the moving object in the second frame image.

15. The image processing system according to claim 9, wherein when the first region includes the second detection position of the moving object in the second frame image, the processing circuitry is further configured to set the position of the cutout region in the second frame image the same as the cutout region in the first frame image.

16. The image processing system according to claim 9, wherein a first shape and a first size of the cutout region in the first frame image are the same as a second shape and a second size of the cutout region in the second frame image.

17. The image processing system according to claim 9, wherein a first position of the center of the cutout region in the first frame image and a second position of the center of the first region are the same as the first detection position of the moving object in the first frame image.

18. The image processing system according to claim 9, wherein the moving object is a human or an automobile.

* * * * *